(12) United States Patent
Liu et al.

(10) Patent No.: US 7,648,650 B2
(45) Date of Patent: Jan. 19, 2010

(54) ALUMINUM-SILICATE BASED ORANGE-RED PHOSPHORS WITH MIXED DIVALENT AND TRIVALENT CATIONS

(75) Inventors: Shengfeng Liu, Fremont, CA (US); Shifan Cheng, Dublin, CA (US); Yi-Qun Li, Danville, CA (US)

(73) Assignee: Intematix Corporation, Fremont, CA (US)

(*) Notice: Subject to any disclaimer, the term of this patent is extended or adjusted under 35 U.S.C. 154(b) by 145 days.

(21) Appl. No.: 11/786,044

(22) Filed: Apr. 9, 2007

(65) Prior Publication Data

US 2008/0111472 A1 May 15, 2008

Related U.S. Application Data

(60) Provisional application No. 60/857,837, filed on Nov. 10, 2006.

(51) Int. Cl.
*C09K 11/59* (2006.01)
(52) U.S. Cl. .................... 252/301.4 F; 252/301.4 R
(58) Field of Classification Search ........... 252/301.4 F, 252/301.4 R
See application file for complete search history.

(56) References Cited

U.S. PATENT DOCUMENTS

| | | | |
|---|---|---|---|
| 4,102,805 A | | 7/1978 | Mizzoni et al. |
| 7,045,826 B2 * | | 5/2006 | Kim et al. ................ 257/98 |
| 7,311,858 B2 | | 12/2007 | Wang et al. |
| 7,390,437 B2 | | 6/2008 | Wang et al. |
| 2005/0168127 A1 * | | 8/2005 | Shei et al. .................. 313/487 |
| 2006/0081814 A1 | | 4/2006 | Shida et al. |
| 2006/0145123 A1 | | 7/2006 | Li et al. |
| 2007/0029526 A1 * | | 2/2007 | Cheng et al. .......... 252/301.4 F |

FOREIGN PATENT DOCUMENTS

| WO | WO 2004/085570 | * 10/2004 |
|---|---|---|
| WO | WO 2006/043745 | * 4/2006 |

OTHER PUBLICATIONS

International Search Report and Written Opinion dated Mar. 7, 2008 for Int'l PCT Application No. PCT/US07/82492.
Shionoya, S., et al., editors, Phosphor Handbook, 1999, CRC Press, New York, p. 684.
Blasse, G., et al., Fluorescence of $Eu^{2+}$-Activated Silicates, 1968, pp. 189-200, Philips Research Reports, vol. 23, No. 1.

* cited by examiner

*Primary Examiner*—C. Melissa Koslow
(74) *Attorney, Agent, or Firm*—Fliesler Meyer LLP (57) ABSTRACT

Novel aluminum-silicate based orange-red phosphors, with mixed di- and trivalent cations are disclosed. The phosphors have the formula $(Sr_{1-x-y}M_xT_y)_{3-m}Eu_m(Si_{1-z}Al_z)O_5$, where M is at least one of Ba, Mg, Ca, and Zn in an amount ranging from $0 \leq x \leq 0.4$. T is a trivalent metal in an amount ranging from $0 \leq y \leq 0$. This phosphor is configured to emit visible light having a peak emission wavelength greater than about 580 nm. The phosphors may contain a halogen anion such as F, Cl, and Br, at least some of which is substitutionally positioned on oxygen lattice sites. The present aluminum-silicate phosphors have applications in white and orange-red illumination systems, as well as plasma display panels.

4 Claims, 9 Drawing Sheets

ALUMINUM-SILICATE BASED ORANGE-RED PHOSPHORS WITH MIXED DIVALENT AND TRIVALENT CATIONS

CROSS REFERENCE TO RELATED APPLICATION

This application claims the benefit of priority to U.S. Provisional Application No. 60/857,837, filed Nov. 10, 2006, the specification and drawings of which are incorporated herein by reference in its entirety.

BACKGROUND OF THE INVENTION

1. Field of the Invention

Embodiments of the present invention are directed in general to the fluorescence of alkaline-earth based, aluminum-silicate phosphors doped with trivalent metals, and configured to emit in the orange to red region of the spectrum. Such phosphors may be used in white light illumination systems commonly called "white light emitting diodes" (LEDs).

2. Description of the Related Art

Devices commonly known as "white LEDs" are known in the art, and they are relatively recent innovations. It was not until light emitting diodes emitting in the blue/ultraviolet region of the electromagnetic spectrum were developed that it became possible to fabricate a white light illumination source based on an LED. Economically, white LEDs have the potential to replace incandescent light sources (light bulbs), particularly as production costs fall and the technology develops further. In particular, the potential of a white light LED is believed to be superior to that of an incandescent bulb in lifetime, robustness, and efficiency. For example, white light illumination sources based on LEDs are expected to meet industry standards for operation lifetimes of 100,000 hours, and efficiencies of 80 to 90 percent. High brightness LEDs have already made a substantial impact on such areas of society as traffic light signals, replacing incandescent bulbs, and so it is not surprising that they will soon provide generalized lighting requirements in homes and businesses, as well as other everyday applications.

Figure 1:
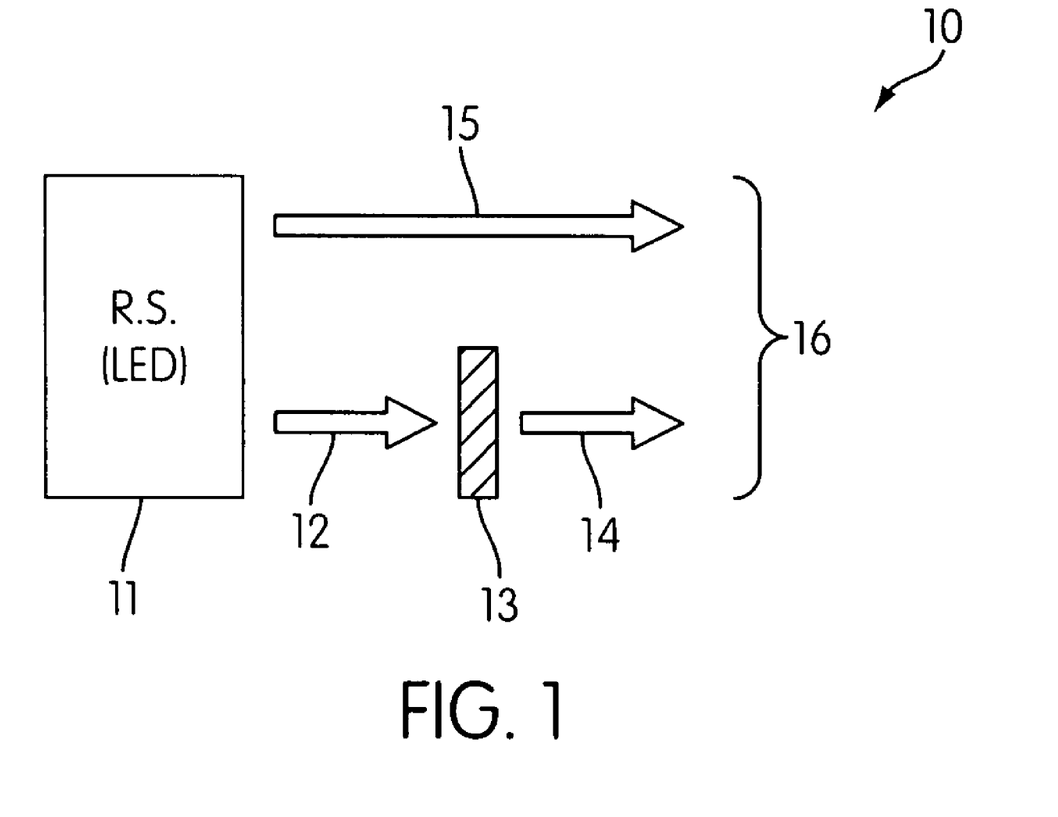
FIG. 1 is a schematic representation of a general scheme for generating white light illumination, the system comprising a radiation source that emits in the visible, and a phosphor that photoluminescences in response to the excitation from the radiation source, wherein the light produced from the system is a mixture of the light emitted from the phosphor and the light emitted from the radiation source.

There are several general approaches to making a white light illumination system based on light emitting phosphors. To date, most white LED commercial products are fabricated based on the approach shown in FIG. 1, where light from a radiation source affects the color output of the white light illumination. Referring to system 10 of FIG. 1, a radiation source 11 (which may be an LED) emits light 12, 15 in the visible portion of the electromagnetic spectrum. Light 12 and 15 is the same light, but is shown as two separate beams for illustrative purposes. A portion of the light emitted from radiation source 11, light 12, excites a phosphor 13, which is a photoluminescent material capable of emitting light 14 after absorbing energy from the source 11. The light 14 can be a substantially monochromatic color in the yellow region of the spectrum, or it can be a combination of green and red, green and yellow, or yellow and red, etc. Radiation source 11 also emits blue light in the visible that is not absorbed by the phosphor 13; this is the visible blue light 15 shown in FIG. 1. The visible blue light 15 mixes with the yellow light 14 to provide the desired white illumination 16 shown in FIG. 1.

What is needed in the art is an enhancement to the silicate-based, orange-red phosphors of the prior art where the enhancement is manifested at least in part by an equal or greater conversion efficiency of blue light to orange light, a so-called red shift. The enhanced orange-red phosphor with low gravity density and low cost may be used in conjunction with a blue LED to generate light whose color output is stable, and whose color mixing results in the desired uniform, low color temperature and warm white color rendering index.

SUMMARY OF THE INVENTION

Embodiments of the present invention include an aluminum-silicate phosphor having the formula $(Sr_{1-x-y}M_xT_y)_{3-m}Eu_m(Si_{1-z}Al_z)O_5$, wherein M is at least one of a divalent metal selected from the group consisting of Ba, Mg, and Ca; T is a trivalent metal; $0 \leq x \leq 0.4$; $0 \leq y \leq 0.4$; $0 \leq z \leq 0.2$; and $0.001 \leq m \leq 0.5$. According to the present embodiments, the trivalent metal T is selected from the group consisting of Y, La, Ce, Pr, Nd, Pm, Sm, Gd, Tb, Dy, Ho, Er, Tm, Yb, Lu, Th, Pa, and U. The phosphor may further include a halogen selected from the group consisting of F, Cl, and Br, and if so, the phosphor is configured such that the halogen resides on oxygen lattice sites within the silicate crystal.

DETAILED DESCRIPTION OF THE INVENTION

The novel aluminum-silicate phosphors of the present embodiments are based on divalent, alkaline earth metals M according to the generalized formula $M_3SiO_5$, and they emit in the orange-red region of the electromagnetic spectrum. The charge imbalance created by substituting aluminum for silicon in the silicate crystal structure is compensated for by substituting trivalent metals for divalent metals in the silicate structure. The present aluminum-silicate orange-red phosphors have applications providing the long wavelength component of a white light illumination system, and may also be used wherever orange-red illumination systems are needed.

The excitation source of a white or orange-red illumination system may comprise either a UV, blue or green light source because of the longer wavelengths (lower energies) of the orange-red color relative to UV, blue, or green. Various embodiments of the present orange-red phosphors will be described in the following order: first, a general description will be given of how aluminum substitutes for silicon in the present aluminum-silicate orange-red phosphors, and how charge compensation is accomplished with the use of mixed di- and tri-valent cations. This will be followed by a discussion of the nature of the host silicate lattice, giving the optical effects of varying the amount of trivalent metal that substitutes for divalent alkaline earth element when aluminum substitutes for silicon. Next, phosphor processing and fabrication methods will be given. Finally, the white light illumination that may be produced using the novel orange-red phosphors of the present invention will be disclosed.

The Novel Orange-red Phosphors of the Present Embodiments

The novel orange-red phosphors of the present invention may be described in general by the formula $(Sr_{1-x-y}M_xT_y)_{3-m}Eu_m(Si_{1-z}Al_z)O_5$, where M is at least one of an alkaline earth, divalent metal selected from the group consisting of Ba, Mg, and Ca, and T is at least one of a trivalent metal selected from the group consisting of Y, La, Ce, Pr, Nd, Pm, Sm, Gd, Tb, Dy, Ho, Er, Tm, Yb, Lu, Th, Pa, and U; $0 \leq x \leq 0.4$; $0 \leq y \leq 0.4$; $0 \leq z \leq 0.2$ and $0.001 \leq m \leq 0.5$. The phosphor is configured to emit visible light having a peak emission wavelength greater than about 580 nm. A specific example of the present aluminum-silicate based orange-red phosphors is $(Sr_{0.88}Ba_{0.1}Y_{0.02})_{3-m}Eu_m(Si_{0.95}Al_{0.05})_5$. In alternative embodiments specific phosphors are $(Sr_{0.88}Ba_{0.1}Sm_{0.017})_{3-m}Eu_m(Si_{0.95}Al_{0.05})O_5$, $(Sr_{0.9}Y_{0.02})_{3-m}Eu_m(Si_{0.95}Al_{0.05})O_5$, $(Sr_{0.86}Ba_{0.1}Y_{0.04})_{3-m}Eu_m(Si_{0.95}Al_{0.1})O_5$, and $(Sr_{0.83}Ba_{0.1}Ca_{0.05}Y_{0.02})_{3-m}Eu_m(Si_{0.95}Al_{0.05})O_5$.

Figure 2:
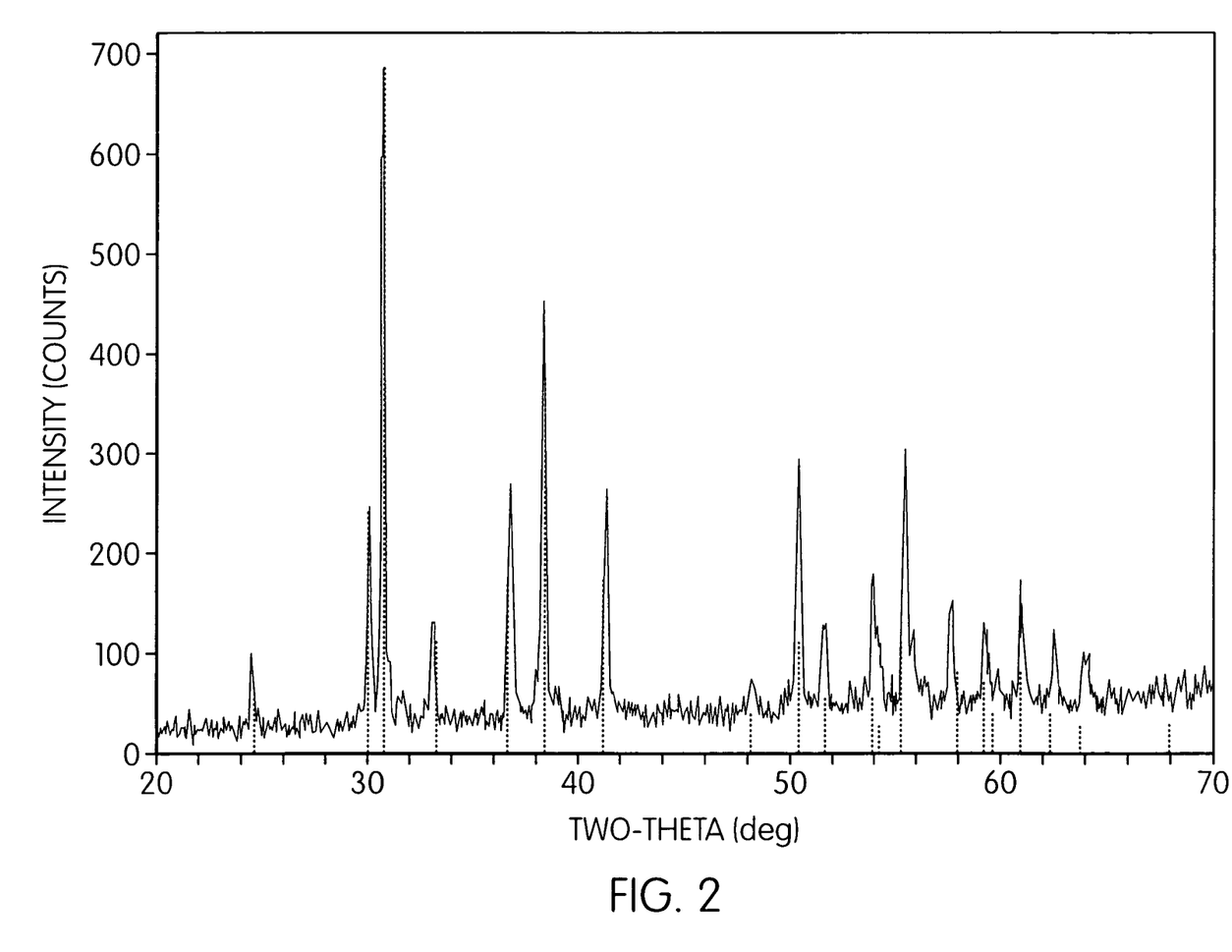
FIG. 2 is an x-ray diffraction pattern of an exemplary aluminum-silicate based orange-red phosphor having the formula $(Sr_{0.88}Ba_{0.1}Y_{0.02})_3(Si_{0.95}Al_{0.05})O_5$:Eu.

As stated by G. Blasse et al. in Philips Research Reports Vol. 23, No. 1, pp. 1-120, the host lattice in a phosphor belonging to the system $Me_3SiO_5$, where Me is either Ca, Sr, or Ba, has the crystal structure (or is related to the crystal structure) $Cs_3CoCl_5$. That the host lattice of the phosphors of the present invention is also crystalline is demonstrated by the x-ray diffraction pattern shown in FIG. 2. The exemplary phosphor in FIG. 2 is $(Sr_{0.88}Ba_{0.1}Y_{0.02})_3(Si_{0.95}Al_{0.05})O_5:Eu$, which was prepared by co-precipitation and sintering at 1250° C. in $H_2$ for 6 hours. Thus, this disclosure has demonstrated that the crystal structure of a specific example of one of the embodiments, given by the formula $(Sr_{0.88}Ba_{0.1}Y_{0.02})_3(Si_{0.95}Al_{0.05})O_5:Eu$, is substantially the same (or at least very similar) to that of $Sr_3SiO_5$.

Figure 3:
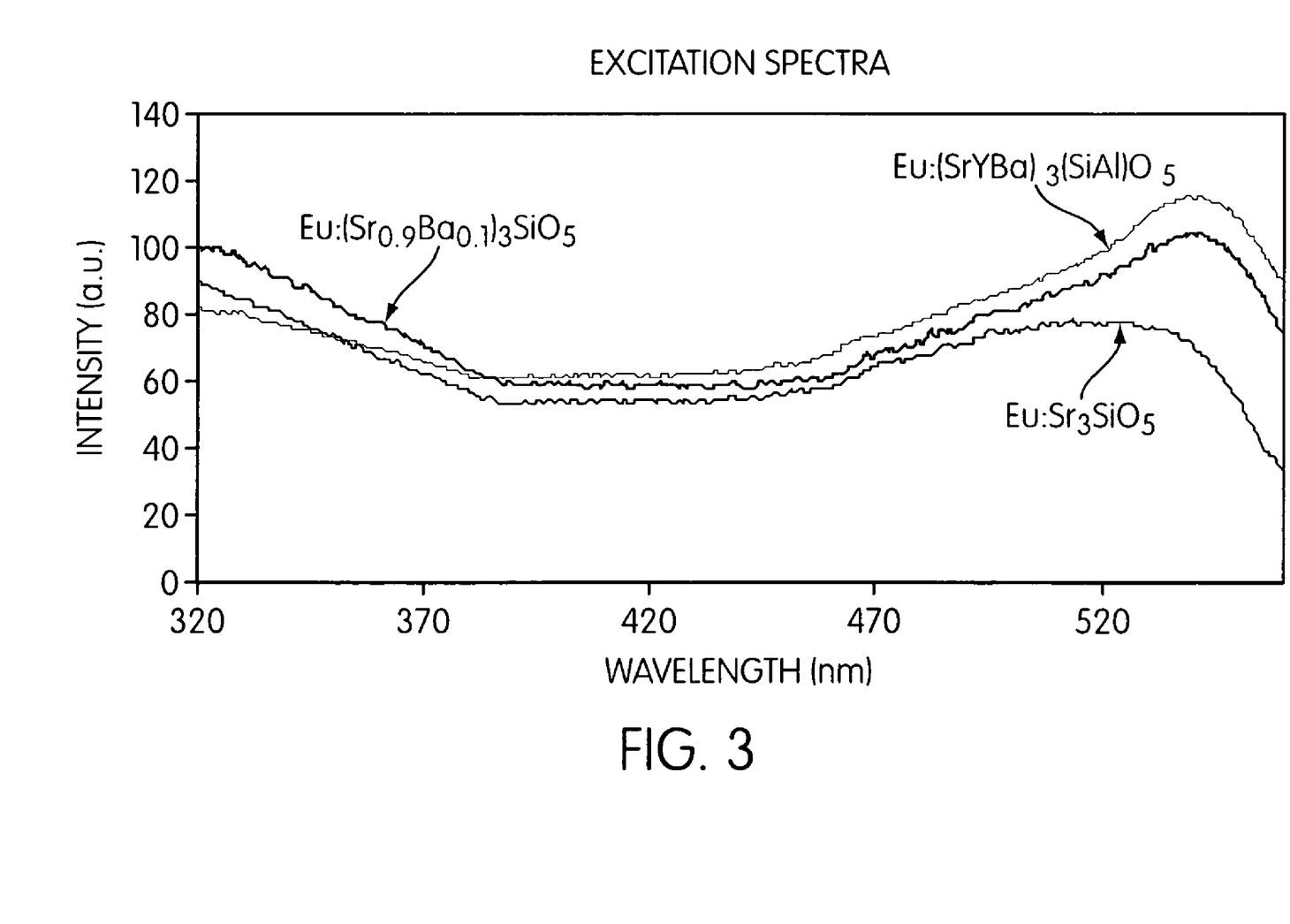
FIG. 3 shows the excitation spectra of $Sr_3SiO_5$:Eu, $(Sr_{0.9}Ba_{0.1})_3SiO_5$:Eu, and $(Ba,Sr,Y)_3(Si,Al)O_5$:Eu, the emission intensity of the phosphors having been recorded at a wavelength of 610 nm, and the spectra showing that these phosphors are efficient at fluorescing when excited at wavelengths ranging from about 380 to about 560 nm.

Excitation spectra are prepared by observing changes in the emitted light intensity at a set wavelength while varying the excitation energy (see, for example, the Phosphor Handbook, edited by S. Shionoya and W. M. Yen, CRC Press, New York, 1999, p. 684). The excitation spectrum of an exemplary orange-red phosphor of the present invention is shown in FIG. 3 with samples $Sr_3SiO_5$ and $(BaSrMg)SiO_5$ shown for reference, the exemplary phosphor having the formula $(Sr_{0.877}Ba_{0.1}Y_{0.023})_3(Si_{0.95}Al_{0.05})O_5:Eu$. The emission intensity at a wavelength of 610 nm was recorded to evaluate the excitation spectra of the phosphors of FIG. 3.

Figure 4:
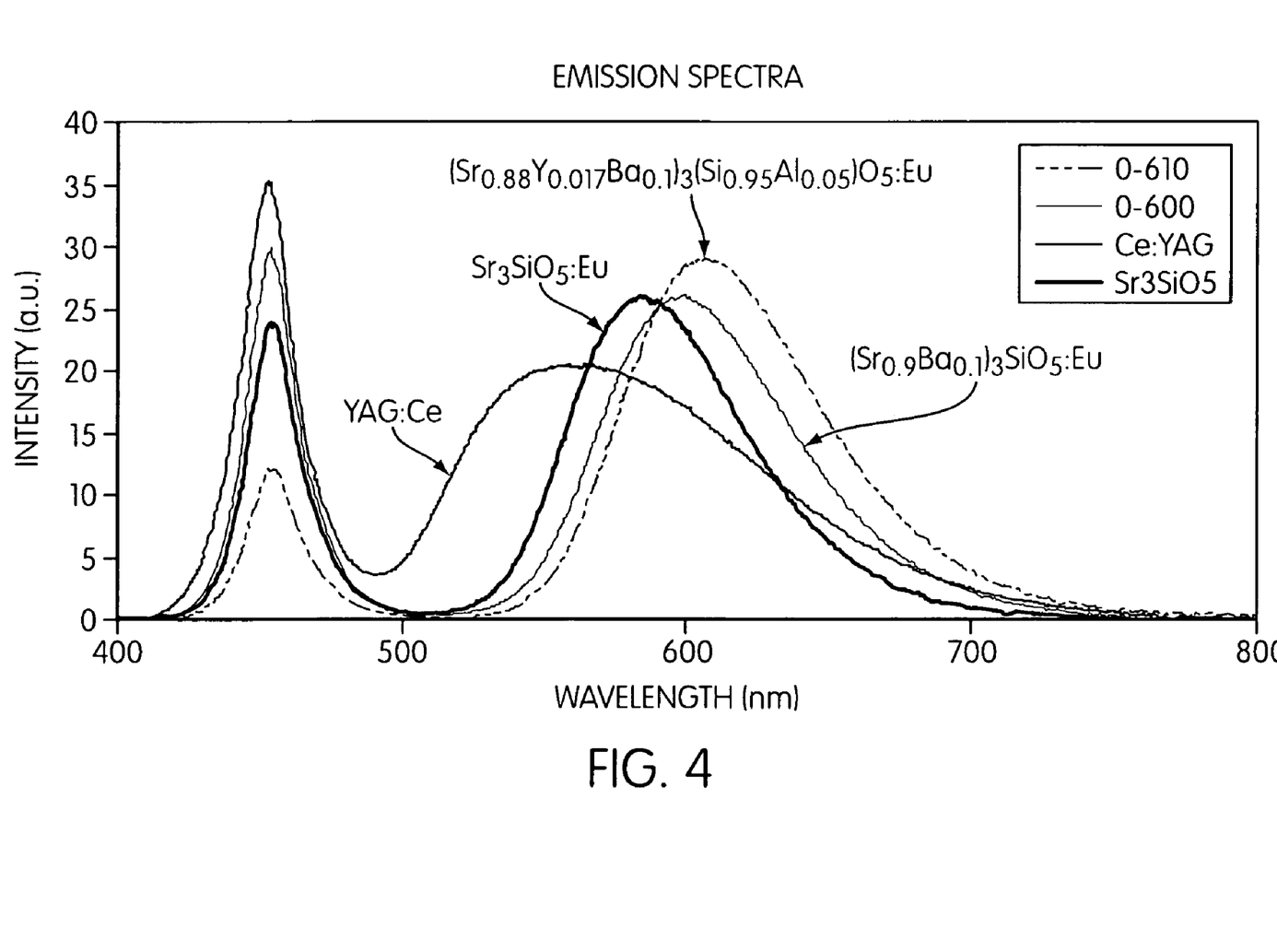
FIG. 4 is a collection of emission spectra of prior art phosphors such as YAG:Ce and $Sr_3SiO_5$:Eu, the emission shown relative to two exemplary phosphors of the present invention having the formulas $(Sr_{0.9}Ba_{0.1})_3SiO_5$:Eu and $(Sr_{0.88}Ba_{0.1}Y_{0.017})_3(Si_{0.95}Al_{0.05})O_5$:Eu; the spectra showing that the exemplary phosphors have longer emission wavelengths and higher brightness than do the prior art phosphors.

The present orange-red phosphors offer emission characteristics that have advantages over the phosphors of the prior art. These characteristics include both the spectral position of the emission peak, as well as the maximum intensity of the peak, particularly as these characteristics contribute to the white light produced by a white light illumination system. FIG. 4 shows a collection of emission spectra of the prior art phosphors YAG:Ce, $Sr_3SiO_5:Eu$, and $(Sr_{0.9}Ba_{0.1})_3SiO_5:Eu$ relative to an exemplary phosphor of the present invention, the present phosphor having the formula $(Sr_{0.88}Ba_{0.1}Y_{0.017})_3(Si_{0.95}Al_{0.05})O_5:Eu$, where this novel phosphor also has the label "O-610." Referring to FIG. 4, the phosphor demonstrating the greatest emission intensity is the novel phosphor according to the present embodiments, $(Sr_{0.88}Ba_{0.1}Y_{0.017})_3(Si_{0.95}Al_{0.05})O_5:Eu$. This phosphor demonstrates both the longest peak emission wavelength (at about 610 nm, well within the orange-red region of the electromagnetic spectrum) and the highest intensity values of the four phosphors depicted in FIG. 4.

Replacement of Sr by Di- and Trivalent Metals, and Replacement of Si by Al

According to the present embodiments, small amounts of divalent alkaline earth metals may be substituted for by small amounts of a trivalent metal, while simultaneously, small amounts of silicon may be replaced by small amounts of aluminum. Thus, the present phosphors may be described by the term, alkaline earth based, aluminum-silicate orange-red phosphors doped with a trivalent metal. The trivalent metal may be a rare earth, as denoted by the lanthamide row of the periodic table, and the first four elements of the actinide series.

Figure 5:
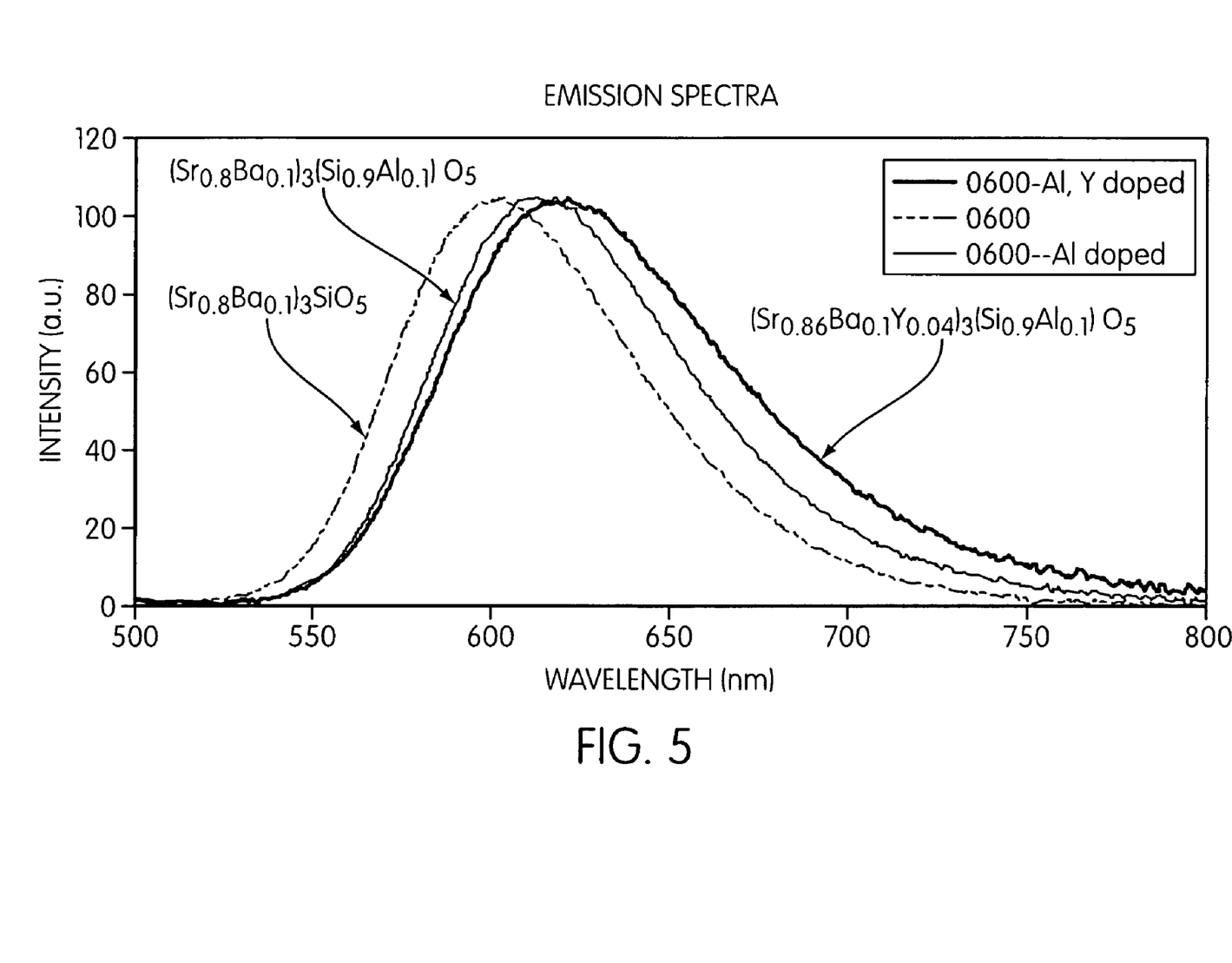
FIG. 5 is a normalized collection of emission spectra from an europium doped phosphor having the composition $(Sr_{0.86}Ba_{0.1}Y_{0.04})_3(Si_{0.95}Al_{0.1})O_5$:Eu, compared to the emission spectra of the phosphors $(Sr_{0.8}Ba_{0.1})_3(Si_{0.9}Al_{0.1})O_5$ and $(Sr_{0.8}Ba_{0.1})_3SiO_5$; the spectra showing that the peak emission wavelength shifts to longer wavelength with the addition of yttrium and with an increase in aluminum concentration.

FIG. 5 shows the effect of adding small quantities of aluminum to a phosphor previously evaluated by the present inventors, such as $(Sr_{0.9}Ba_{0.1})_3SiO_5$. Inspection of FIG. 5 shows that adding aluminum causes the emission peak wavelength to shift from about 600 nm to a longer wavelength of about 606 nm. Furthermore, the addition of small quantities of a trivalent rare earth element, such as Y, further moves the emission peak wavelength to about 610 nm, or even longer. The trivalent rare earth element may also be La, Ce, Pr, Nd, Pm, Sm, Gd, Tb, Dy, Ho, Er, Tm, Yb, Lu, Th, Pa, and U, and combinations thereof.

Though not wishing to be bound by any particular theory, the inventors attribute this effect to the substitution within the crystal lattice of trivalent rare earth atoms for strontium atoms, and aluminum atoms for silicon atoms, where the substituting atoms may actually occupy strontium and silicon atom lattice positions in the $M_3SiO_5$ lattice, respectively. The nomenclature presently used to describe this embodiment is $(Sr_{0.9-y}Ba_{0.1}T_y)_3(Si_{1-z}Al_z)O_5$, where T is at least one of a trivalent metal selected from the group consisting of Y, La, Ce, Pr, Nd, Pm, Sm, Gd, Tb, Dy, Ho, Er, Tm, Yb, Lu, Th, Pa, and U; and where y and z have the same values as described earlier in this disclosure.

Additional experiments by the present inventors demonstrates that the emission peak of a phosphor having the formula $(Sr_{0.82}Ba_{0.1}Ca_{0.05}Y_{0.033})_3(Si_{0.9}Al_{0.1})O_5$:Eu shifts the peak emission wavelength towards the red end of the visible spectrum, to about 620 nm, but the emission intensity is lower than that of the phosphor having the formula $(Sr_{0.88}Ba_{0.1}Y_{0.017})_3(Si_{0.95}Al_{0.05})O_5$:Eu. For this latter case, the peak of the emission rests at about 610 nm.

Figure 6:
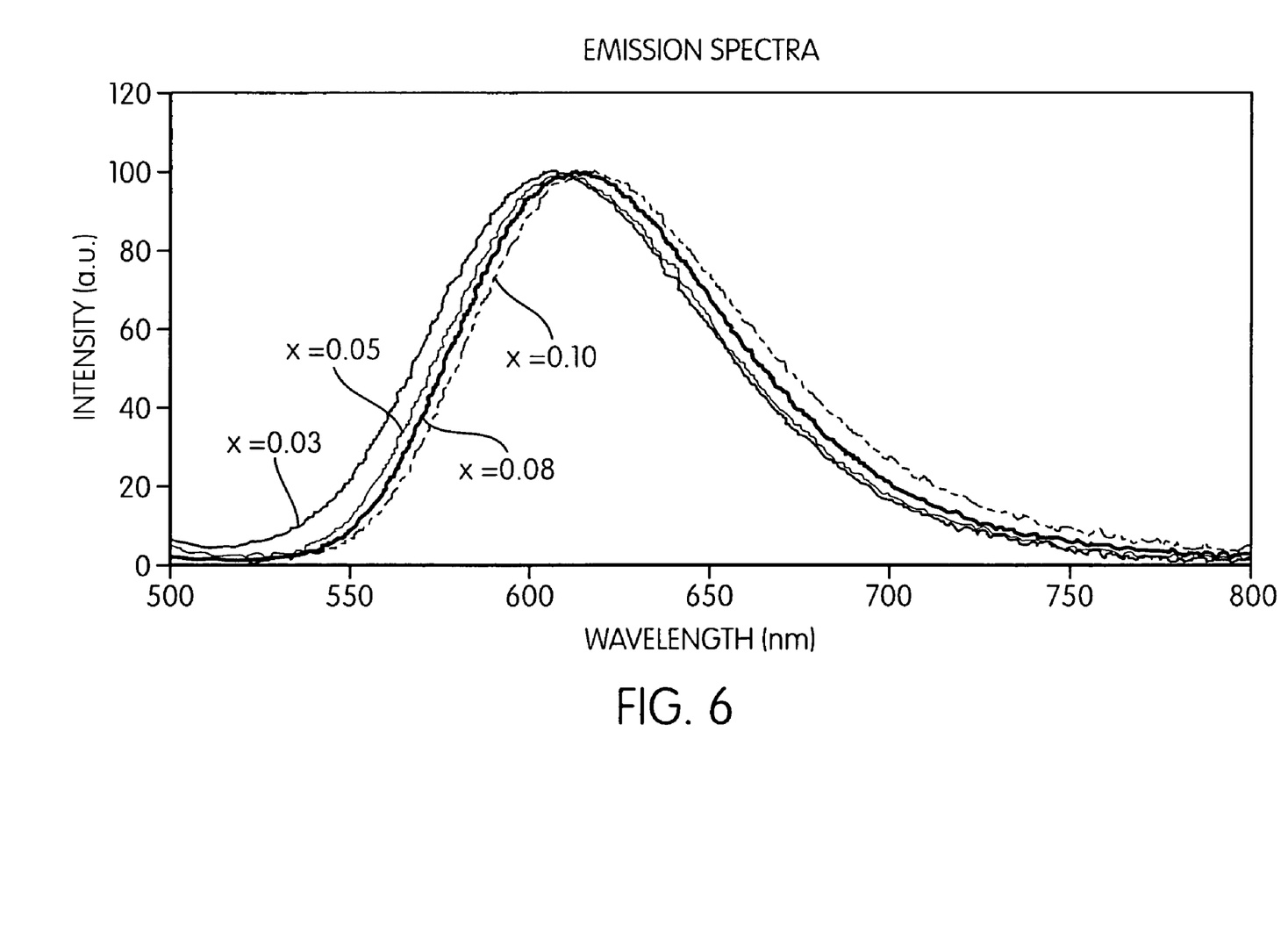
FIG. 6 is a collection of emission spectra for the series $(Sr_{0.85-x/3}Ba_{0.1}Ca_{0.5}Y_{x/3})_3(Si_{1-x}Al_x)O_5$:Eu, showing that the peak emission wavelength shifts to longer wavelength with an increase in aluminum and/or yttrium concentration.
Figure 7:
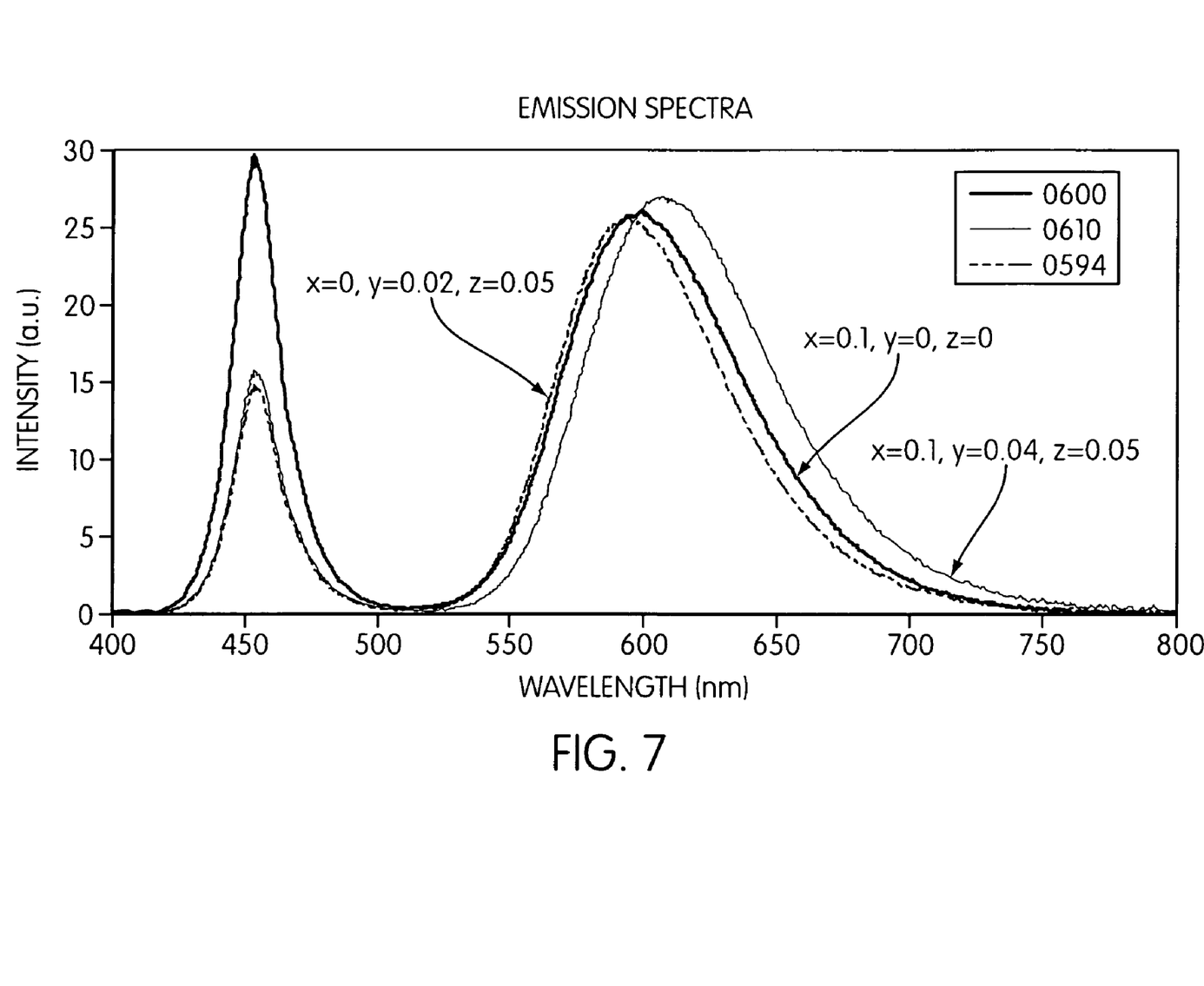
FIG. 7 is a collection of emission spectra for the series $(Sr_{1-x-y}Ba_xY_y)_3(Si_{1-z}Al_z)O_5$:Eu; the spectra showing that the peak emission wavelength shifts to longer wavelengths, and that the peak emission intensity decreases with changes in the concentrations of barium, yttrium, and/or aluminum.

Exemplary data showing the effect of the inclusion of both barium and calcium, while simultaneously increasing the amounts of the trivalent rare earth Yttrium (Y) and aluminum in an exemplary phosphor composition, is shown in FIG. 6. The data in this graphs illustrates that simultaneously increasing the aluminum and yttrium concentrations in an Eu activated $(Sr_{0.85-x/3}Ba_{0.1}Ca_{0.05}Y_{x/3})_3(Si_{1-x}Al_x)O_5$:Eu system increases the emission peak wavelength that is obtainable (although the emission intensities decrease dramatically with further increase of Al and Y concentration). As the value of "x" in the four curves of FIG. 6 increases from 0.03 first to 0.05, then 0.08, and then 0.10, the peak emission wavelength also increases.

Phosphor Fabrication Processes

Methods of fabricating the novel di-, tri-valent metal based aluminum-silicate phosphors of the present embodiments are not limited to any one fabrication method, but may, for example, be fabricated in a three step process that includes: 1) blending starting materials, 2) firing the starting material mix, and 3) processing the fired material according to any one of several techniques, including pulverizing, reducing, and drying. The starting materials may comprise various kinds of powders, such as alkaline earth metal compounds, rare earth metal compounds, silicon-containing compounds, aluminum-containing compounds, and europium compounds. Examples of the alkaline earth metal compounds include alkaline earth metal carbonates, nitrates, hydroxides, oxides, oxalates, and halides.

Examples of rare earth metal compounds include rare earth metal nitrates, oxides, and halides. Examples of aluminum-containing compounds include nitrates, carbonates, oxides. Examples of silicon compounds include oxides such as silicon oxide and silicon dioxide. Examples of europium compounds include europium oxide, europium fluoride, and europium chloride.

The starting materials are blended in a manner such that the desired final composition is achieved. In one embodiment, for example, the divalent alkaline earth, trivalent rare earth, silicon (and/or aluminum), and europium compounds are blended in the appropriate ratios, and then fired to achieve the desired composition. The blended starting materials may be fired in a second step, and to enhance the reactivity of the blended materials (at any or various stages of the firing), a flux may be used. The flux may comprise various kinds of halides and boron compounds, examples of which include strontium fluoride, barium fluoride, calcium fluoride, europium fluoride, ammonium fluoride, lithium fluoride, sodium fluoride, potassium fluoride, strontium chloride, barium chloride, calcium chloride, europium chloride, ammonium chloride, lithium chloride, sodium chloride, potassium chloride, and combinations thereof. Examples of boron-containing flux compounds include boric acid, boric oxide, strontium borate, barium borate, and calcium borate. In some embodiments, the flux compound is used in amounts where the number of mole percent ranges from between about 0.1 to 3.0, where values may typically range from about 0.1 to 1.0 mole percent, both inclusive.

Various techniques for mixing the starting materials (with or without the flux) include using a mortar, mixing with a ball mill, mixing using a V-shaped mixer, mixing using a cross rotary mixer, mixing using a jet mill and mixing using an agitator. The starting materials may be either dry mixed or wet mixed, where dry mixing refers to mixing without using a solvent. Solvents that may be used in a wet mixing process include water or an organic solvent, where the organic solvent may be either methanol or ethanol. The mix of starting materials may be fired by numerous techniques known in the art. A heater such as an electric furnace or gas furnace may be used for the firing. The heater is not limited to any particular type, as long as the starting material mix is fired at the desired temperature for the desired length of time. In some embodiments, firing temperatures may range from about 800 to about 1600° C. The firing time may range from about 10 minutes to about 1,000 hours. The firing atmosphere may be selected from among air, a low-pressure atmosphere, a vacuum, an inert-gas atmosphere, a nitrogen atmosphere, an oxygen atmosphere, an oxidizing atmosphere, and/or a reducing atmosphere. Since $Eu^{2+}$ ions need to be included in the phosphor at some stage of the firing, it is desired in some embodiments to provide a reducing atmosphere using a mixed gas comprising nitrogen and hydrogen.

Illustrative methods of preparing the present phosphors include a sol-gel method and a solid reaction method. The sol-gel method may be used to produce powder phosphors. A typical procedure comprised the steps of:

a) dissolving desired amounts of alkaline earth nitrates (Mg, Ca, Sr and/or Ba), trivalent rare earth nitrates, and $Eu_2O_3$ and/or $BaF_2$ or other alkaline earth metal halides in dilute nitric acid; and b) dissolving a corresponding amount of silica gel in deionized water to prepare a second solution;

c) mixing the two solutions from steps a) and b) for about two hours, and then adding ammonia to generate a gel from the mixed solution d) following formation of the gel, the pH was adjusted to about 9.0, and the gelled solution stirred continuously at about 60° C. for 3 hours;

e) drying the gelled solution by evaporation, and then decomposing the resulted dry gel at about 500 to 700° C. for about 60 minutes to decompose and acquire oxides;

f) cooling and grinding with certain amount of $NH_4F$ or other ammonia halides when alkaline earth metal halides are not used, then sintering the powder in a reduced atmosphere for about 6 to 10 hours. The reducing/sintering temperature ranged in the present experiments from about 1200 to about 1400° C.

In certain embodiments, the solid reaction method was also used for silicate-based phosphors. The steps of a typical procedure used for the solid reaction method can include the following:

a) wet mixing with a ball mill desired amounts of alkaline earth oxides or carbonates (Mg, Ca, Sr and/or Ba) and trivalent rare earth metal oxides (Y, La, Ce, Pr, Nd, Pm, Sm, Gd, Tb, Dy, Ho, Er, Tm, Yb, Lu, Th, Pa, and U), dopants of $Eu_2O_3$ and/or $BaF_2$ or other alkaline earth metal halides, corresponding $SiO_2$ and/or $NH_4F$ or other ammonia halides;

b) drying and grinding the resulting powder, and then carrying out a sintering operation in a reduced atmosphere for about 6 to 10 hours. The reducing/sintering temperature ranged from about 1200 to about 1400° C.

Production of White Light Illumination

The white light illumination that may be produced using the inventive orange-red phosphor according to the present embodiments will be discussed in this final portion of the disclosure, beginning with a description of illustrative blue LEDs that may be used as an excitation radiation source. That the present orange-red phosphors are capable of absorbing and being excited by light over a large range of wavelengths, including the blue portion of the visible, is demonstrated by the excitation spectra of FIG. 3. According to the general scheme of FIG. 1, light from the inventive orange-red phosphor may be combined with light from the blue LED to make white illumination. Alternatively, light from the inventive orange-red phosphor (excited by light from a non-visible UV excitation source) may be combined with light from another phosphor, such as, for example, a yellow or green phosphor. Thus, the color rendering of the white light may be adjusted by including other phosphors in the white light illumination system.

The Blue LED Radiation Source

In certain embodiments, the blue light emitting LED emits light having a main emission peak in the wavelength range greater than or equal to about 400 nm, and less than or equal to about 520 nm. This light serves two purposes: 1) it provides the excitation radiation to the phosphor system, and 2) it provides blue light which, when combined with the light emitted from the phosphor system, makes up the white light of the white light illumination.

In certain embodiments, the blue LED emits light greater than or equal to about 420 nm, and less than or equal to about 500 nm. In yet another embodiment, the blue LED emits light greater than or equal to about 430 and less than or equal to about 480 nm. The blue LED wavelength may be 450 nm.

The blue light emitting device of the present embodiments is herein described generically as a "blue LED," but it will be understood by those skilled in the art that the blue light emitting device may be at least one of (wherein it is contemplated to have several operating simultaneously) a blue light emitting diode, a laser diode, a surface emitting laser diode, a resonant cavity light emitting diode, an inorganic electroluminescence device and an organic electroluminescence device. If the blue light emitting device is an inorganic device, it may be a semiconductor selected from the group consisting of a gallium nitride based compound semiconductor, a zinc selenide semiconductor and a zinc oxide semiconductor.

FIG. 3 is an excitation spectrum of the present orange/red phosphors, showing that these novel phosphors are capable of absorbing radiating over a range of about 320 to 560 nm.

The Inventive Orange-red Phosphor in Combination with Other Phosphors

In one embodiment of the present invention, a white illumination device can be constructed using a GaN based blue LED having an emission peak wavelength ranging about 430 nm to about 480 nm, in combination with the inventive orange-red phosphor having an emission peak wavelength greater than about 580 nm. It will be understood by those skilled in the art that light emitted from the present orange-red phosphors may be combined with light from a visible blue radiation source, or light from a blue, green, or yellow phosphor, among other phosphors.

Examples of blue phosphors that may be used in keeping with the above concept have been described in a U.S. Pat. No. 7,390,437, titled "Aluminate-based blue phosphors," filed Jul. 1, 2005, by inventors Ning Wang, Yi Dong, Shifan Cheng, and Yi-Qun Li, assigned to Internatix Corporation of Fremont, Calif. Of course, virtually any blue phosphor may be appropriate for this application, including commercial BAM phosphors, but the Internatix phosphors work particularly well. These phosphors may be described by the generalized formula $(M_{1-x}Eu_x)_{2-z}Mg_zAl_yO_{[1+(3/2)y]}$, where M is at least one of Ba or Sr. These blue phosphors may emit at wavelengths ranging from about 420 to about 560 nm.

Figure 8:
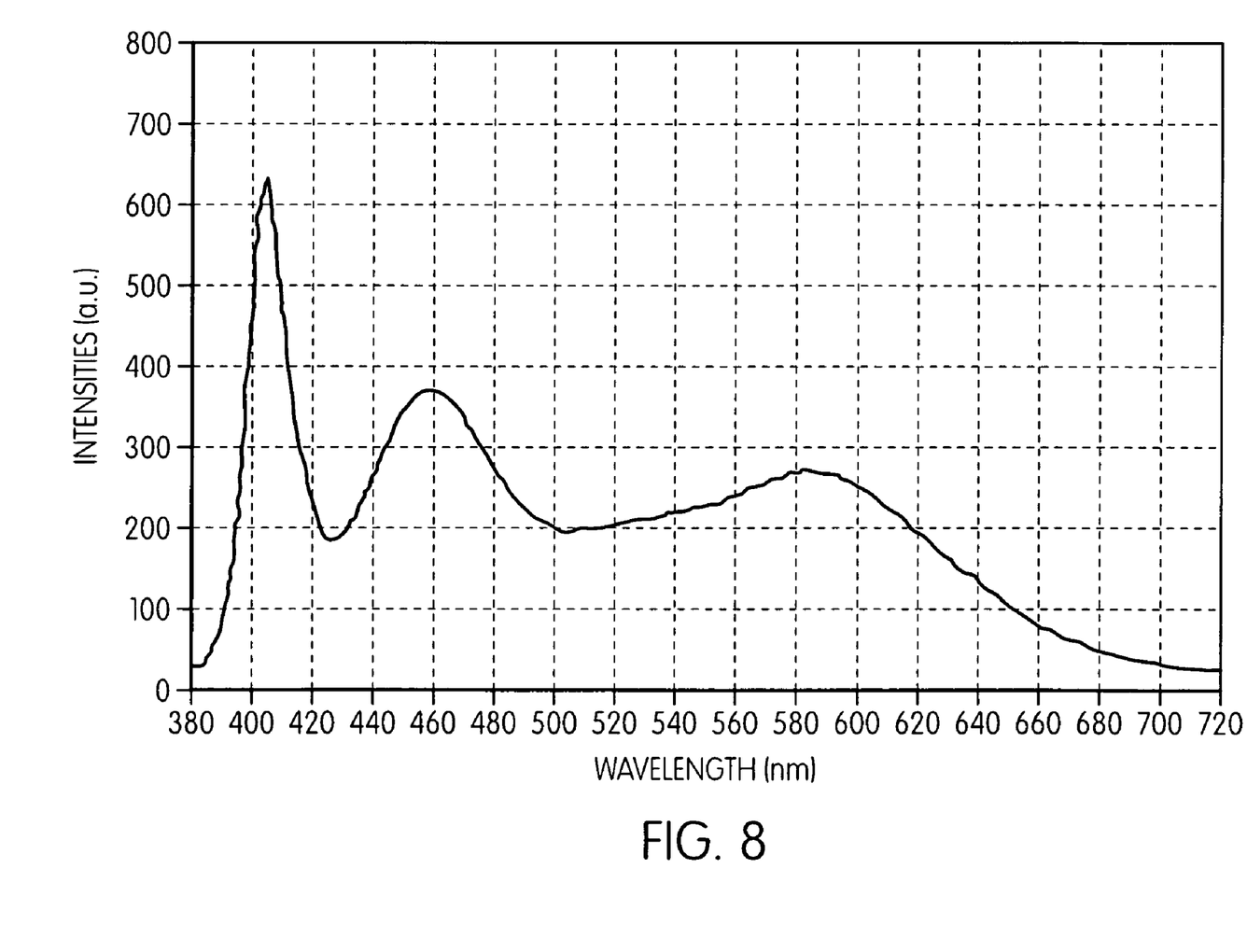
FIG. 8 is a graph of the emission intensity of a white light illumination system comprising an orange-red phosphor of the present embodiments, a green phosphor and a blue phosphor, the orange-red phosphor having the formula $(Sr_{0.88}Ba_{0.1}Y_{0.017})_3(Si_{0.95}Al_{0.05})O_5$:Eu, the green phosphor having the formula $(Sr_{0.575}Ba_{0.4}Mg_{0.025})_2Si(O,F)_4:Eu^{2+}$, and the blue phosphor having the formula $(Sr_{0.5}Eu_{0.5})MgAl_{10}O_{17}$.

An example of the white light that may be obtained from an orange-red phosphor of the present embodiments, in combination with the green and blue phosphors described in the above-mentioned applications, is shown in FIG. 8. This white light was produced by an orange-red phosphor having the formula $(Sr_{0.88}Ba_{0.1}Y_{0.017})_3(Si_{0.95}Al_{0.05})(O,F)_5:Eu$, in combination with a blue phosphor having the formula $(Sr_{0.5}Eu_{0.5})MgAl_{10}O_{17}$ and green phosphor having formula $(Sr_{0.575}Ba_{0.4}Mg_{0.025})_2Si(O,F)_4:Eu^{2+}$. The white light thus produced demonstrated a brightness with Ra higher than 90.

Alternatively, the present orange-red phosphors may be used in combination with a yellow phosphor (with or without blue light from a blue LED excitation source; and with or without a blue phosphor, green phosphor, red phosphor, etc.) such as those commercially available yellow phosphors (e.g., a YAG:Ce phosphor), or a yellow phosphor in keeping with concepts described in a U.S. Pat. No. 7,311,858, titled "Novel silicate based yellow-green phosphors," filed Sep. 22, 2004, by inventors Ning Wang, Yi Dong, Shifan Cheng, and Yi-Qun Li. Of course, virtually any yellow phosphor may be appropriate for this application. These phosphors may be described by the generalized formula $A_2SiO_4:Eu^{2+}H$, where A is at least one divalent metal selected from the group consisting of Sr, Ca, Ba, Mg, Zn, and Cd, and H is a dopant selected from the group consisting of F, Cl, Br, I, P, S, and N. In some embodiments of the present invention, the dopant H, which may be a halogen, is contained within the lattice of the phosphor crystal by substitutionally residing on oxygen lattice sites. In other words, the H dopand, which may be a halogen, is not substantially contained within the grain boundaries between crystallites.

Alternatively, the present orange-red phosphors may be used in combination with a green phosphor (with or without blue light from a blue LED excitation source; and with or without a blue phosphor, yellow phosphor, red phosphor, etc.), including commercially available green phosphors. Especially appropriate are green phosphors described in a U.S. Pat. No. 7,575,697, titled "Silicate-based green phosphors," filed Nov. 8, 2005, by inventors Yi-Qun Li, Yi Dong, Dejie Tao, Shifan Cheng, and Ning Wang, Of course, virtually any green phosphor may be appropriate for this application. These phosphors may be described by the generalized formula $(Sr,A_1)_x(Si,A_2)(O,A_3)_{2+x}:Eu^{2+}$, wherein $A_1$ is at least one of a divalent, 2+ cation, including Mg, Ca, Ba, Zn or a combination of 1+ and 3+ cations, the 1+ cations including $K^+$, $Na^+$, $Li^+$ and the 3+ cations including $Y^{3+}$, $Ce^{3+}$, $La^{3+}$; $A_2$ is a 3+, 4+, or 5+ cation, including at least one of B, Al, Ga, C, Ge, and P; $A_3$ is a 1−, 2−, or 3− anion, including F, Cl, Br, C, N, and S; and x is any value between 1.5 and 2.5.

Figure 9:
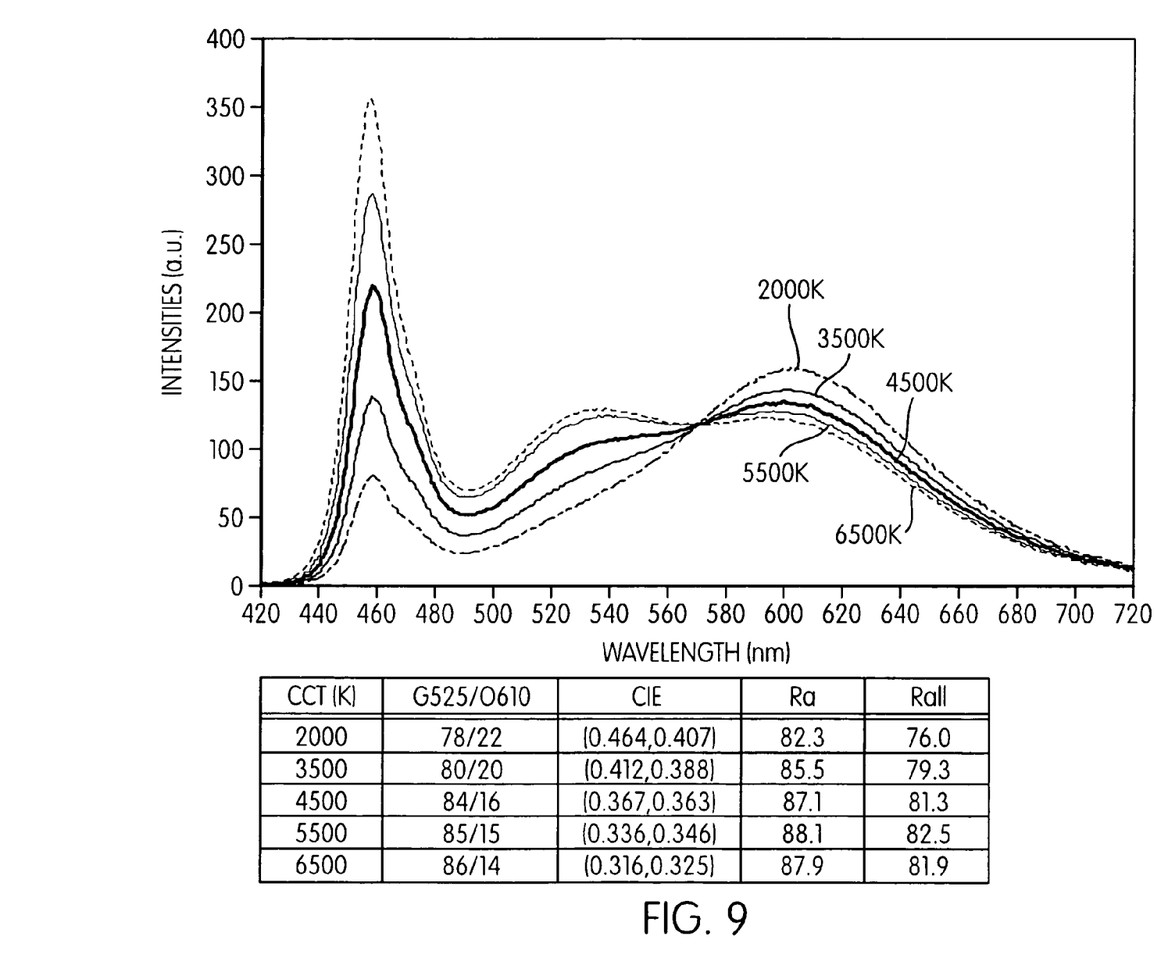
FIG. 9 is a graph showing a series of emission spectra for a warm white light illumination system with controlled color temperatures ranging from about 2,000 K to about 6,500 K, the warm white light illumination system comprising an orange-red phosphor of the present embodiments and a green phosphor previously disclosed by the inventors, the orange-red phosphor having the formula $(Sr_{0.88}Ba_{0.1}Y_{0.017})_3(Si_{0.95}Al_{0.05})O_5:Eu^{2+}$ (labeled as O610 in the table accompanying the graph), and the green phosphor having the formula $(Sr_{0.5}Ba_{0.5})_2Si(OF)_4:Eu^{2+}$ (labeled as G525 in the table accompanying the graph).

FIG. 9 shows an example of a series of white LEDs with color temperatures ranging from about 2,000K to about 6,500K, configured by the different ratios of the green phosphor having the formula $(Sr_{0.6}Ba_{0.375}Mg_{0.025})_2Si(O,F)_4:Eu^{2+}$ (G525) to an orange-red phosphor of the present embodiments having the formula $(Sr_{0.88}Ba_{0.1}Y_{0.017})_3$ $(Si_{0.95}Al_{0.05})O_5:Eu^{2+}$, designated by the symbol "O610." Such an approach is particularly useful in warm white illumination systems displaying similar warm white color generated by conventional incandescent lamps. Advantageously, however, the warm white produced by the present invention has a much higher lumens per watt rating that that for a conventional incandescent lamp.

Many modifications of the illustrative embodiments of the invention disclosed above will readily occur to those skilled in the art. Accordingly, the invention is to be construed as including all structure and methods that fall within the scope of the appended claims.

What is claimed is:

1. An aluminum-silicate phosphor having the formula $(Sr_{1-x-y}M_xT_y)_{3-m}Eu_m(Si_{1-z}Al_z)O_5$, wherein:

M is at least one of a divalent metal selected from the group consisting of Ba, Mg, and Ca;

T is a trivalent metal;

$0 \leq x \leq 0.4$;

$0 \leq y \leq 0.4$;

$0 \leq z \leq 0.2$; and $0.001 \leq m \leq 0.5$.

2. The aluminum-silicate phosphor of claim 1, wherein the trivalent metal T is selected from the group consisting of Y, La, Ce, Pr, Nd, Pm, Sm, Gd, Tb, Dy, Ho, Er, Tm, Yb, Lu, Th, Pa, and U.

3. The aluminum-silicate phosphor of claim 1, wherein the phosphor further includes a halogen selected from the group consisting of F, Cl, and Br.

4. The aluminum-silicate phosphor of claim 3, wherein the phosphor is configured such that the halogen resides on oxygen lattice sites within the silicate crystal.

* * * * *

UNITED STATES PATENT AND TRADEMARK OFFICE
CERTIFICATE OF CORRECTION

PATENT NO.        : 7,648,650 B2                                         Page 1 of 1
APPLICATION NO.   : 11/786044
DATED             : January 19, 2010
INVENTOR(S)       : Shengfeng Liu, Shifan Cheng and Yi-Qun Li It is certified that error appears in the above-identified patent and that said Letters Patent is hereby corrected as shown below:

Column 10, line 4 should be: $0 < z \leq 0.2$; and

Signed and Sealed this
First Day of March, 2011

David J. Kappos
*Director of the United States Patent and Trademark Office*